United States Patent
Ikeda et al.

(10) Patent No.: US 9,920,737 B2
(45) Date of Patent: Mar. 20, 2018

(54) INTERNAL COMBUSTION ENGINE

(75) Inventors: Yuji Ikeda, Kobe (JP); Seiji Kanbara, Kobe (JP)

(73) Assignee: IMAGINEERING, INC., Kobe-shi, Hyogo (JP)

( * ) Notice: Subject to any disclaimer, the term of this patent is extended or adjusted under 35 U.S.C. 154(b) by 188 days.

(21) Appl. No.: 13/982,593

(22) PCT Filed: Feb. 15, 2012

(86) PCT No.: PCT/JP2012/053515
§ 371 (c)(1),
(2), (4) Date: Dec. 5, 2013

(87) PCT Pub. No.: WO2012/111700
PCT Pub. Date: Aug. 23, 2012

(65) Prior Publication Data
US 2014/0076257 A1   Mar. 20, 2014

(30) Foreign Application Priority Data
Feb. 15, 2011   (JP) .................. 2011-030080

(51) Int. Cl.
*F02P 23/04*   (2006.01)
*F02B 23/08*   (2006.01)
(Continued)

(52) U.S. Cl.
CPC ............ *F02P 23/045* (2013.01); *F02B 23/08* (2013.01); *F02P 3/01* (2013.01); *F02P 23/04* (2013.01);
(Continued)

(58) Field of Classification Search
CPC ... F02B 23/08; F02B 51/04; F02P 1/00; F02P 3/01; F02P 23/04; F02P 23/045; F02P 9/002; F02P 9/007
(Continued)

(56) References Cited

U.S. PATENT DOCUMENTS 5,983,871 A * 11/1999 Gordon .................. F02P 23/04
123/143 B
7,793,632 B2 * 9/2010 Idogawa ............... F02P 23/045
123/143 B
(Continued)

FOREIGN PATENT DOCUMENTS

JP   2009-103039 A   5/2009
JP   2009103039 A *  5/2009   ............ F02P 23/045
(Continued)

OTHER PUBLICATIONS

International Search Report dated Jul. 24, 2012, issued in corresponding application No. PCT/JP2012/053515.

*Primary Examiner* — Sizo Vilakazi
*Assistant Examiner* — Kevin R Steckbauer
(74) *Attorney, Agent, or Firm* — Westerman, Hattori, Daniels & Adrian, LLP

(57) ABSTRACT

In an internal combustion engine that causes a predetermined gas flow in a combustion chamber, discharge plasma generated by a discharge device is caused to effectively absorb energy of an electromagnetic wave emitted from an electromagnetic wave emission device. At a time when a discharge operation and an emission operation are simultaneously performed so as to ignite a fuel air mixture, an emitting position of the electromagnetic wave on an antenna during the emission operation is located downstream of the discharge gap in a direction of the gas flow at the discharge gap so as to face toward the discharge plasma that has been drifted due to the gas flow.

5 Claims, 12 Drawing Sheets

(51) Int. Cl.
  *F02P 3/01*    (2006.01)
  *F02B 51/04*   (2006.01)
  *F02P 1/00*    (2006.01)
  *F02P 9/00*    (2006.01)

(52) U.S. Cl.
  CPC ............... *F02B 51/04* (2013.01); *F02P 1/00* (2013.01); *F02P 9/007* (2013.01); *Y02T 10/125* (2013.01)

(58) Field of Classification Search
  USPC ...... 123/143 B, 163, 169 EL, 605, 608, 634, 123/635, 647
  See application file for complete search history.

(56) References Cited

U.S. PATENT DOCUMENTS

| | | | | |
|---|---|---|---|---|
| 8,036,808 B2* | 10/2011 | Mori | ................. | F02P 9/00 123/169 EA |
| 2004/0173165 A1* | 9/2004 | Sieber | ................. | F02M 43/00 123/3 |
| 2010/0180871 A1* | 7/2010 | Ikeda | ................. | F02B 23/08 123/536 |
| 2011/0025210 A1* | 2/2011 | Ikeda | ................. | F02B 23/08 315/111.21 |
| 2011/0030660 A1* | 2/2011 | Ikeda | ................. | F02B 1/02 123/536 |
| 2011/0031886 A1 | 2/2011 | Ikeda | | |

FOREIGN PATENT DOCUMENTS

| | | |
|---|---|---|
| JP | 2010-96127 A | 4/2010 |
| WO | 2009/113690 A1 | 9/2009 |
| WO | 2009/113693 A1 | 9/2009 |

\* cited by examiner

INTERNAL COMBUSTION ENGINE

TECHNICAL FIELD

The present invention relates to an internal combustion engine provided with an electromagnetic wave emission device that emits an electromagnetic wave to a combustion chamber.

BACKGROUND ART

Conventionally, there is known an internal combustion engine provided with an electromagnetic wave emission device that emits an electromagnetic wave to a combustion chamber. For example, Japanese Unexamined Patent Application, Publication No. 2009-36198 discloses an internal combustion engine of this kind. Japanese Unexamined Patent Application, Publication No. 2009-36198 discloses an internal combustion engine provided with an ignition or plasma generation device. The ignition or plasma generation device mixes a high voltage pulse with a microwave pulse and supplies them to an ignition plug, thereby igniting fuel air mixture in a combustion chamber.

Furthermore, conventionally, there is known an internal combustion engine configured to produce a predetermined gas flow such as a tumble flow in a combustion chamber. This kind of internal combustion engine agitates a fuel air mixture by the gas flow so as to ensure a uniform distribution of the fuel.

THE DISCLOSURE OF THE INVENTION

Problems to be Solved by the Invention

In the internal combustion engine that produces the predetermined gas flow (such as the tumble flow), discharge plasma generated by a discharge device is drifted due to the gas flow. Therefore, even if the electromagnetic wave emission device is applied to this kind of internal combustion engine, and a discharge gap is irradiated with the electromagnetic wave, since a major part of the discharge plasma does not remain in the discharge gap, it is impossible to cause the discharge plasma to effectively absorb energy of the electromagnetic wave. For example, in a case in which the electromagnetic wave is emitted to the combustion chamber so as to expand a lean limit, it is impossible to fully expand the lean limit.

The present invention has been made in view of the above described circumstances, and it is an object of the present invention, in an internal combustion engine that produces a predetermined gas flow in a combustion chamber, to cause discharge plasma generated by a discharge device to effectively absorb energy of an electromagnetic wave emitted from an electromagnetic wave emission device.

Means for Solving the Problems

In accordance with a first aspect of the present invention, there is provided an internal combustion engine including: an internal combustion engine main body configured to produce a predetermined gas flow in a combustion chamber; a discharge device that generates discharge plasma at a discharge gap located in the combustion chamber; and an electromagnetic wave emission device including an electromagnetic wave oscillator that oscillates an electromagnetic wave, and an antenna for emitting the electromagnetic wave supplied from the electromagnetic wave oscillator to the combustion chamber. The internal combustion engine that simultaneously performs a discharge operation of causing the discharge device to generate the discharge plasma and an emission operation of emitting the electromagnetic wave from the antenna by driving the electromagnetic wave oscillator, thereby supplying the discharge plasma with energy of the electromagnetic wave so as to ignite a fuel air mixture in the combustion chamber. The electromagnetic wave emission device is configured such that an emitting position of the electromagnetic wave on the antenna during the emission operation is located downstream of the discharge gap in a direction of the gas flow at the discharge gap so as to face toward the discharge plasma that has been drifted due to the gas flow.

According to the first aspect of the present invention, the discharge operation and the emission operation are simultaneously performed. The discharge device generates the discharge plasma. On the other hand, the electromagnetic wave emission device emits the electromagnetic wave from the antenna to the combustion chamber. During the emission operation, the emitting position (radiating position) of the electromagnetic wave on the antenna is located downstream of the discharge gap in the direction of the gas flow at the discharge gap so as to face toward the discharge plasma that has been drifted due to the gas flow. The discharge plasma that has been drifted due to the gas flow is present at a location which the electromagnetic wave is emitted to. Accordingly, the discharge plasma effectively absorbs the energy of the electromagnetic wave emitted from the antenna.

In accordance with a second aspect of the present invention, in addition to the first aspect of the present invention, an antenna having an emitting position of the electromagnetic wave during the emission operation, the emitting position facing toward the discharge plasma that has been drifted due to the gas flow, is assumed as a first antenna, the electromagnetic wave emission device includes, in addition to the first antenna, a second antenna for emitting an electromagnetic wave, and an emitting position on the second antenna during the emission operation is located downstream of the discharge gap further away from the emitting position of the electromagnetic wave on the first antenna in relation to the direction of the gas flow at the discharge gap so that the electromagnetic wave emitted at a time of the discharge operation from the second antenna creates a strong electric field region, which has an electric field relatively strong in intensity in the combustion chamber, in a region adjacent to the discharge plasma that has been drifted due to the gas flow.

According to the second aspect of the present invention, at the time of the discharge operation, the second antenna emits the electromagnetic wave so as to create the strong electric field region in the region adjacent to the discharge plasma that has absorbed the energy of the electromagnetic wave emitted from the first antenna. The discharge plasma reacts with the electric field of the strong electric field region. The discharge plasma is supplied with the energy of the electromagnetic wave from the first and second antennae.

In accordance with a third aspect of the present invention, in addition to the second aspect of the present invention, the electromagnetic wave emission device includes a third antenna located further away from the discharge device than the first antenna and the second antenna, and generates electromagnetic wave plasma by emitting the electromagnetic wave from the third antenna to a region not yet reached by a flame surface after the fuel air mixture has been ignited.

According to the third aspect of the present invention, during a flame propagation after the fuel air mixture has been ignited, the electromagnetic wave plasma is generated in the region not yet reached by the flame surface. The electromagnetic wave plasma generates active species. The flame surface passes through a region in which the active species are generated.

In accordance with a fourth aspect of the present invention, in addition to the third aspect of the present invention, the third antenna is located so as to emit the electromagnetic wave to a region where occurrence frequency of knocking is relatively high in the combustion chamber.

According to the fourth aspect of the present invention, in a region where occurrence frequency of knocking is relatively high in the combustion chamber, active species are generated before the flame surface reaches the region. When knocking is caused, the speed of the flame surface is decreased before the flame surface reaches a region where knocking is likely to be caused, thereby resulting in the knocking. According to the fourth aspect of the present invention, the active species are generated in the region where knocking is likely to be caused. Therefore, the speed of the flame surface is prevented from decreasing.

In accordance with a fifth aspect of the present invention, in addition to the first aspect of the present invention, the electromagnetic wave emission device emits the electromagnetic wave from the antenna to a region which the flame surface has passed through after the fuel air mixture has been ignited.

According to the fifth aspect of the present invention, after the fuel air mixture has been ignited, the antenna emits the electromagnetic wave to the region which the flame surface has passed through. In the region after the flame has passed through, temperature rises due to the electromagnetic wave, and oxidation reaction of the fuel air mixture is promoted. Furthermore, pressure rises behind the flame surface, and flame propagation is promoted.

In accordance with a sixth aspect of the present invention, in addition to the first aspect of the present invention, the emitting position of the electromagnetic wave on the antenna is covered by an insulator or dielectric material.

In accordance with a seventh aspect of the present invention, in addition to the first aspect of the present invention, a pair of floating electrodes are provided facing toward each other on opposite sides with respect to an imaginary line passing through the discharge gap and the emitting position of the electromagnetic wave on the antenna during the emission operation.

According to the seventh aspect of the present invention, it is difficult for the discharge plasma generated at the discharge gap to drift toward either side of the floating electrodes.

In accordance with an eighth aspect of the present invention, there is provided an internal combustion engine including: an internal combustion engine main body configured to produce a predetermined gas flow in a combustion chamber; a discharge device that generates discharge plasma at a discharge gap located in the combustion chamber; and an electromagnetic wave emission device including an electromagnetic wave oscillator that oscillates an electromagnetic wave, and an antenna for emitting the electromagnetic wave supplied from the electromagnetic wave oscillator to the combustion chamber. The internal combustion engine simultaneously performs a discharge operation of causing the discharge device to generate the discharge plasma and an emission operation of emitting the electromagnetic wave from the antenna by driving the electromagnetic wave oscillator, thereby supplying the discharge plasma with energy of the electromagnetic wave so as to ignite a fuel air mixture in the combustion chamber. The electromagnetic wave emission device is configured such that an emitting position of the electromagnetic wave on the antenna during the emission operation is located downstream of the discharge gap in a direction of the gas flow at the discharge gap so that the electromagnetic wave emitted from the antenna at a time of the discharge operation creates a strong electric field region, which has an electric field relatively strong in intensity in the combustion chamber, in a region adjacent to the discharge plasma that has been drifted due to the gas flow.

According to the eighth aspect of the present invention, at the time of the discharge operation, the antenna emits the electromagnetic wave so as to create the strong electric field region at the region adjacent to the discharge plasma. The discharge plasma reacts with the electric field of the strong electric field region. The discharge plasma is supplied with the energy of the electromagnetic wave from the antenna.

Effect of the Invention

According to the present invention, since the discharge plasma, which has been drifted due to the gas flow, is present at a location which the electromagnetic wave is emitted to, the discharge plasma can effectively absorb the energy of the electromagnetic wave. Accordingly, in comparison with a conventional internal combustion engine that is not configured in view of the fact that the discharge plasma may be drifted, it is possible to increase the energy of the electromagnetic wave absorbed by the discharge plasma, thereby making it possible to reduce the intensity of the reflection electromagnetic wave. Therefore, it is possible to attain ignition stability even if lean fuel air mixtures are in use.

Furthermore, according to the second aspect of the present invention, since the discharge plasma is supplied with the energy of the electromagnetic wave from the first and second antennae, it is possible to supply a larger amount of energy to the discharge plasma.

Furthermore, according to the third aspect of the present invention, it is configured such that the active species are generated in a region not yet reached by the flame surface to ensure that the flame surface passes through the region in which the active species are generated. Accordingly, oxidation reaction on the flame surface is promoted by the active species, and it is possible to improve the propagation speed of the flame surface. Therefore, it is possible to reduce an amount of unburned fuel in a case in which a lean fuel air mixture is burned.

Furthermore, according to the fourth aspect of the present invention, the speed of the flame surface is prevented from decreasing before the flame surface reaches a region in which knocking is likely to be caused. Therefore, it is possible to cause the flame to reach a region in which knocking is likely to be caused before knocking is actually caused, thereby making it possible to suppress the occurrence of knocking.

Furthermore, according to the fifth aspect of the present invention, it is configured such that the electromagnetic wave is emitted to a region which the flame has passed through so as to promote the oxidation reaction of the fuel air mixture, thereby promoting the flame propagation from behind the flame surface. Therefore, it is possible to reduce an amount of unburned fuel in a case in which a lean fuel air mixture is burned.

Furthermore, according to the seventh aspect of the present invention, it is difficult for the discharge plasma generated at the discharge gap to drift toward either side of the floating electrodes, thereby maintaining a drift direction of the discharge plasma constant to some extent. As a result thereof, it is possible to increase a period of time, in which the emitting position of the electromagnetic wave on the antenna can face toward the discharge plasma. Accordingly, it is possible to increase the amount of energy of the electromagnetic wave absorbed by the discharge plasma.

Furthermore, according to the eighth aspect of the present invention, the discharge plasma is supplied with the energy of the electromagnetic wave from the antenna. Therefore, it is possible to attain ignition stability even if lean fuel air mixtures are in use.

BEST MODE FOR CARRYING OUT THE INVENTION

Figure 1:
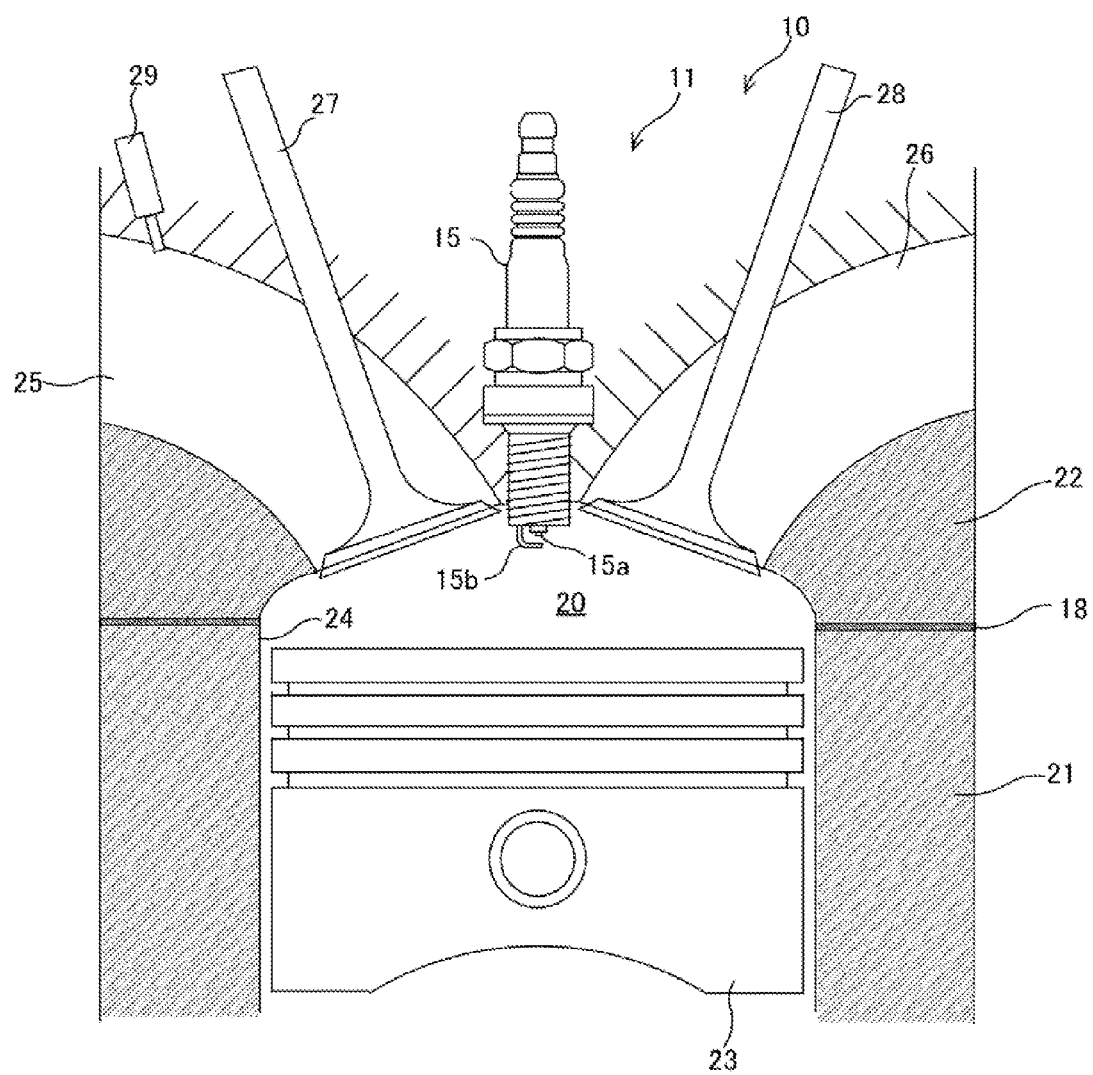
FIG. 1 is a schematic configuration diagram of an internal combustion engine according to an embodiment.

In the following, a detailed description will be given of the embodiment of the present invention with reference to drawings. It should be noted that the following embodiment is a mere example that is essentially preferable, and is not intended to limit the scope of the present invention, applied field thereof, or application thereof.

Embodiment

The present embodiment is directed to an internal combustion engine 10 including an electromagnetic wave emission device 13 that emits an electromagnetic wave to a combustion chamber 20. The internal combustion engine 10 is a reciprocating type engine in which a piston 23 reciprocates. The internal combustion engine 10 is provided with an internal combustion engine main body 11, a discharge device 12, and the electromagnetic wave emission device 13. The internal combustion engine 10 is controlled by an electronic control device 30 (ECU).

<Internal Combustion Engine Main Body>

As shown in FIG. 1, the internal combustion engine main body 11 is provided with a cylinder block 21, a cylinder head 22, and the pistons 23. The cylinder block 21 is formed with a plurality of cylinders 24 each having a circular cross section. Inside of each cylinder 24, the piston 23 is reciprocatably mounted. The piston 23 is connected to a crankshaft (not shown) via a connecting rod (not shown). The crankshaft is rotatably supported by the cylinder block 21. While the piston 23 reciprocates in each cylinder 24 in an axial direction of the cylinder 24, the connecting rod converts the reciprocation movement of the piston 23 into rotation movement of the crankshaft.

The cylinder head 22 is placed on the cylinder block 21, and a gasket 18 intervenes between the cylinder block 21 and the cylinder head 22. The cylinder head 22 partitions the combustion chamber 20 along with the cylinder 24 and the piston 23.

The cylinder head 22 is provided with one spark plug 15 for each cylinder 24. The spark plug 15 is attached to the cylinder head 22 so that a discharge gap between a central electrode 15a and a ground electrode 15b is located in the combustion chamber 20.

The cylinder head 22 is formed with an intake port 25 and an exhaust port 26 for each cylinder 24. The intake port 25 is provided with an intake valve 27 for opening and closing the intake port 25, and an injector 29 for injecting fuel. On the other hand, the exhaust port 26 is provided with an exhaust valve 28 for opening and closing the exhaust port 26.

The internal combustion engine 10 is designed such that the intake port 25 forms a strong tumble flow 35 in the combustion chamber 20. The tumble flow 35 serves as the predetermined gas flow 35 produced in the internal combustion engine 10. In the combustion chamber 20, a fuel air mixture that has flowed in from the intake port 25 flows toward the direction of the exhaust port 26 along a ceiling surface of the combustion chamber 20 (a surface of the cylinder head 22 exposed to the combustion chamber 20), and the flow rotates in a vertical direction along a wall surface of the cylinder 24 and a top surface of the piston 23. The tumble flow 35 is produced during an intake stroke and a compression stroke.

<Discharge Device>

Figure 2:
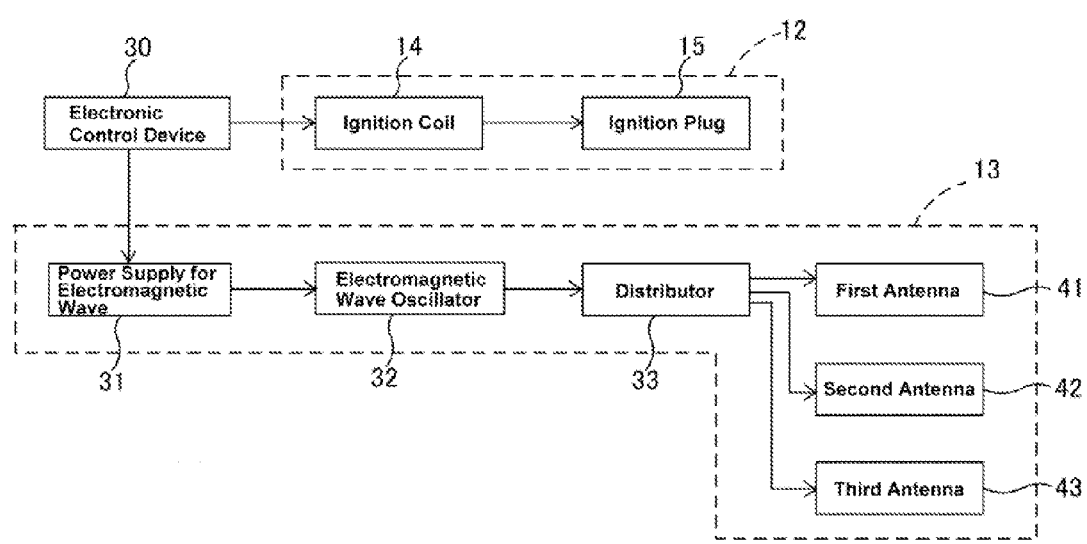
FIG. 2 is a block diagram of a discharge device and an electromagnetic wave emission device according to the embodiment.

The discharge device 12 is provided in association with each combustion chamber 20. As shown in FIG. 2, the discharge device 12 includes an ignition coil (a pulse output part) 14 that outputs a high voltage pulse, and an ignition plug (a discharge generation part) 15 that causes discharge when applied with the high voltage pulse from the ignition coil 14.

The ignition coil 14 is connected to a direct current power supply (not shown) such as a battery of a vehicle. The ignition coil 14, upon receiving an ignition signal from the electronic control device 30, boosts a voltage applied from the direct current power supply, and outputs the boosted high voltage pulse to the ignition plug 15. The ignition plug 15, upon application of the high voltage pulse, causes insulation breakage at the discharge gap so as to cause a spark discharge. The spark discharge generates discharge plasma 36.

Figure 3:
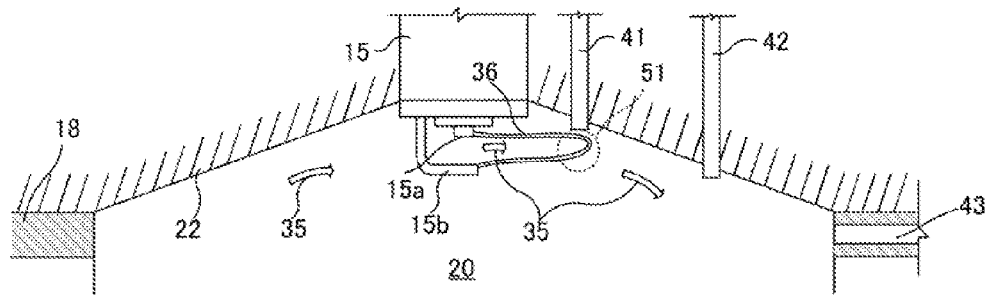
FIG. 3 is a schematic configuration diagram of a relevant part of the internal combustion engine according to the embodiment, FIG. 3a showing a first antenna emitting a microwave, FIG. 3b showing a second antenna emitting a microwave, and FIG. 3c showing a third antenna emitting a microwave.
Figure 3:
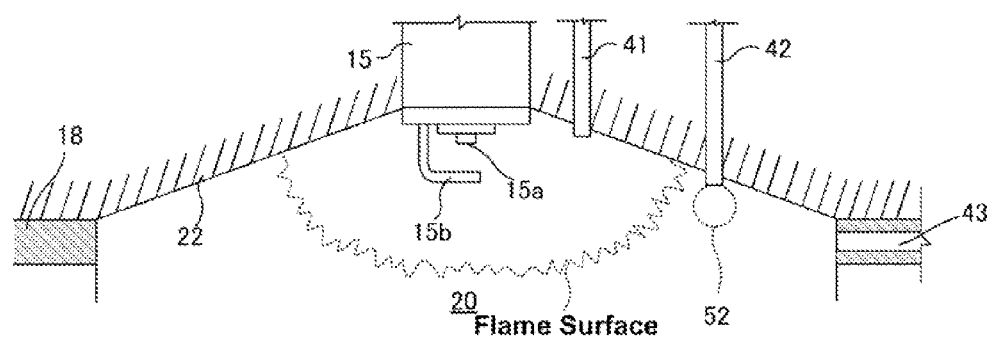
Figure 3:
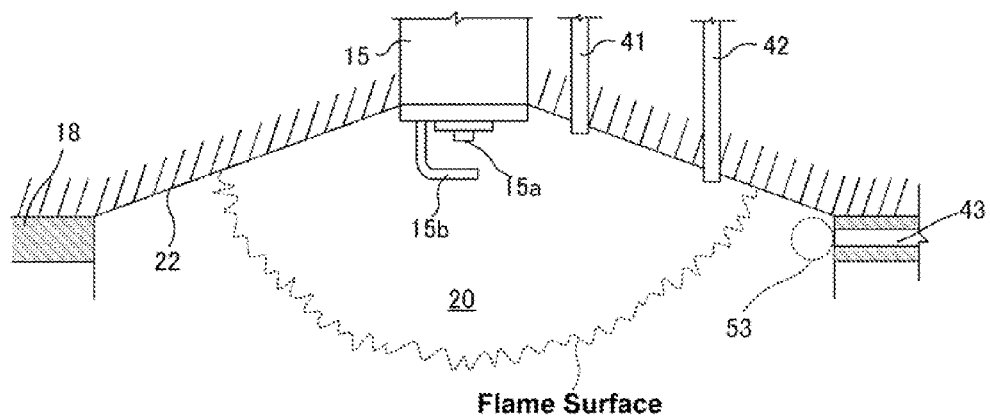

As described above, the strong tumble flow 35 is formed during the intake stroke and the compression stroke in the combustion chamber 20, as shown in FIG. 3. At an ignition timing when the piston 23 locates before a compression top dead center, a bulk flow of the fuel air mixture at the discharge gap flows from the side of the intake port 25 to the side of the exhaust port 26 under influence of the tumble flow 35. As a result of this, the discharge plasma 36 generated by the spark discharge is drifted toward the side of the exhaust port 26. The discharge plasma 36 is extended due to the gas flow 35.

Figure 4:
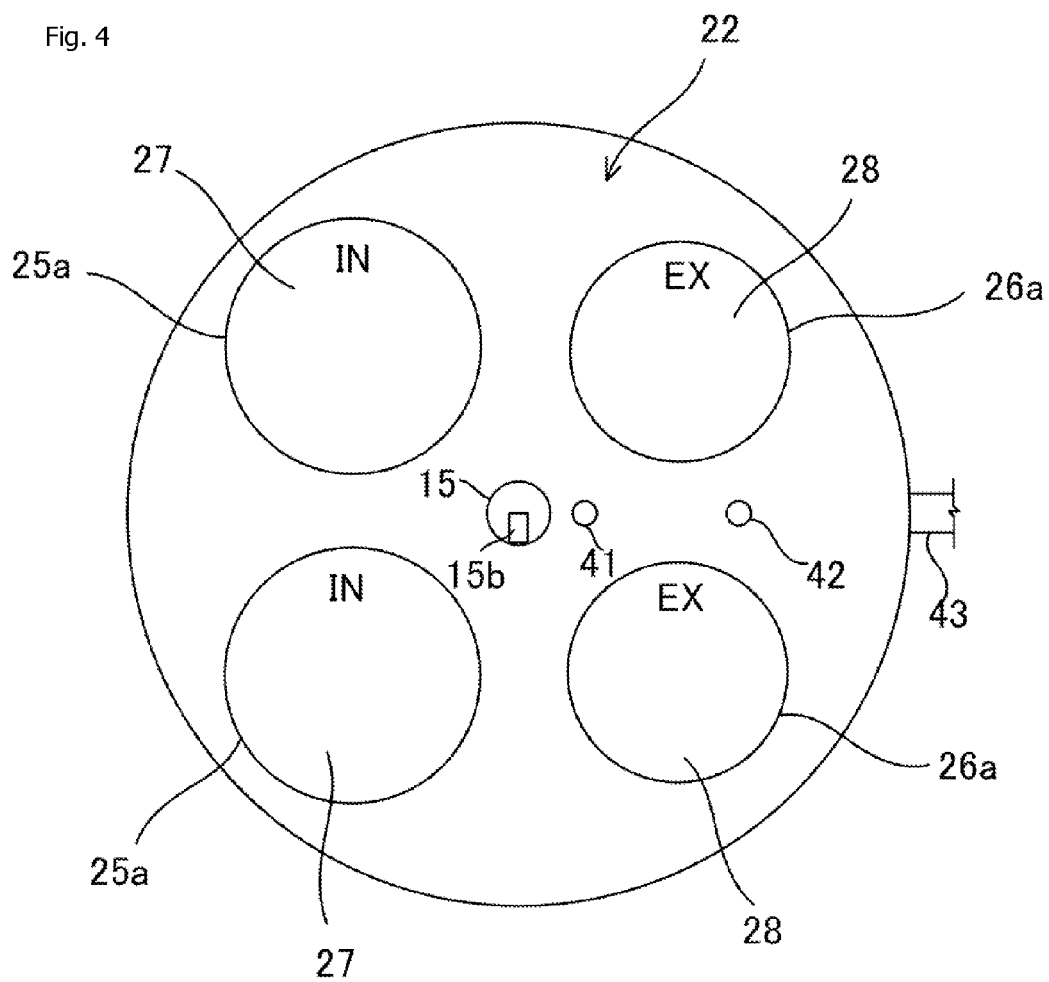
FIG. 4 is a front view of a ceiling surface of a combustion chamber of the internal combustion engine according to the embodiment.

According to the present embodiment, as shown in FIG. 4, a connecting part of the ground electrode 15b, which extends in an axial direction of the ignition plug 15 (a base end side part of the ground electrode 15b), locates toward a side of a middle region between an opening part 25a of the intake port 25 and an opening part 26a of the exhaust port 26. As a result of this, the gas flow 35 at the discharge gap is hardly influenced by the connecting part. A direction of the gas flow 35 at the discharge gap is approximately directed toward a midpoint between the opening parts 26a of the two exhaust ports 26. Therefore, the discharge plasma 36 is drifted approximately toward the midpoint between the opening parts 26a of the two exhaust ports 26. Actually, the discharge plasma 36 is drifted toward the direction of a first antenna 41, which will be described later, due to the tumble flow 35.

<Electromagnetic Wave Emission Device>

As shown in FIG. 2, the electromagnetic wave emission device 13 includes a power supply for electromagnetic wave 31, an electromagnetic wave oscillator 32, a distributor 33, and a plurality of antennae 41 to 43. According to the present embodiment, three antennae 41 to 43 are provided for each combustion chamber 20. FIG. 2 shows only the antennae 41 to 43 corresponding to one combustion chamber 20.

The power supply for electromagnetic wave 31, upon receiving an electromagnetic wave drive signal from the electronic control device 30, supplies a pulse current to the electromagnetic wave oscillator 32. The electromagnetic wave drive signal is a pulse signal. The power supply for electromagnetic wave 31 outputs the pulse current at a predetermined duty cycle during a period starting from a rising timing of the electromagnetic wave drive signal until a falling timing thereof. The pulse current is continuously outputted during a time period of a pulse width of the electromagnetic wave drive signal.

The electromagnetic wave oscillator 32 is, for example, a magnetron. The electromagnetic wave oscillator 32, upon receiving the pulse current, outputs a microwave pulse. The electromagnetic wave oscillator 32 continuously outputs the microwave pulse during the time period of the pulse width of the electromagnetic wave drive signal. In place of the magnetron, other types of oscillators such as a semiconductor oscillator may be employed.

The distributor 33 switches the antenna to be supplied with the microwave outputted from the electromagnetic wave oscillator 32, from among the three antennae 41 to 43. The distributor 33, upon receiving a distribution signal from the electronic control device 30, supplies the microwave to the three antennae 41 to 43 in turn.

As shown in FIG. 3, the three antennae 41 to 43 consist of the first antenna 41, a second antenna 42, and a third antenna 43, seen from the side of the ignition plug 15. Each of antennae 41 to 43 may be, for example, a monopole antenna. A tip end of each of antennae 41 to 43 corresponds to an emitting position (radiating position) of the microwave.

The first and second antennae 41 and 42 are embedded in the cylinder head 22. Emitting ends of the microwave (tip ends) of the first and second antennae 41 and 42 are slightly protruded from a surface of the cylinder head 22 (the ceiling surface of the combustion chamber 20). As shown in FIG. 4, the emitting ends of the first and second antennae 41 and 42 are located in the middle between the opening parts 26a of the two exhaust ports 26. The emitting ends of the first and second antennae 41 and 42 are arranged along a radial direction of the combustion chamber 20.

The third antenna 43 is embedded in the gasket 18, and provided with an emitting end of microwave, which is approximately flush with an inner periphery of the gasket 18. The third antenna 43 is provided further away from the discharge device 12 than the first and second antennae 41 and 42.

An input end (a base end) of each of antennae 41 to 43 is connected to the distributor 33. From the emitting end of each of antennae 41 to 43, the microwave supplied from the distributor 33 is emitted to the combustion chamber 20.

According to the present embodiment, during an ignition operation, which will be described later, the emitting end of the first antenna 41 is located downstream of the discharge gap in the direction of the gas flow 35 at the discharge gap so that the discharge plasma 36 that has been drifted due to the tumble flow 35 is irradiated with the microwave. The emitting end of the first antenna 41 is located in the vicinity of the ignition plug 15 on the ceiling surface of the combustion chamber 20. The emitting end of the first antenna 41 faces toward a flexure part of the discharge plasma 36, which is located at a position most distant from the discharge gap (a part that has been drifted furthest away by the tumble flow 35). Here, the emitting end of the first antenna 41 faces toward the flexure part of the discharge plasma 36 throughout an entire operating range of generating the microwave plasma during the ignition operation.

According to the present embodiment, the second and third antennae 42 and 43 are disposed on the same side as the first antenna 41 in relation to the ignition plug 15. However, the second and third antennae 42 and 43 may be disposed on a side opposite to the first antenna 41 in relation to the ignition plug 15.

<Ignition Operation>

The ignition operation of the fuel air mixture performed by the discharge device 12 and the electromagnetic wave emission device 13 will be described hereinafter. During the ignition operation, a discharge operation of the discharge device 12 for generating the discharge plasma 36 and an emission operation of emitting the microwave from the first antenna 41 by driving the electromagnetic wave oscillator 32 are simultaneously performed so that the discharge plasma 36 is supplied with energy of the microwave, thereby igniting the fuel air mixture in the combustion chamber 20.

During the ignition operation, the electronic control device 30 outputs the ignition signal and the electromagnetic wave drive signal. Then, in the discharge device 12, the ignition coil 14 outputs the high voltage pulse at a falling timing of the ignition signal, and the spark discharge is caused at the ignition plug 15. On the other hand, in the electromagnetic wave emission device 13, the power supply for electromagnetic wave 31 continuously outputs the pulse current during a period starting from a rising timing of the electromagnetic wave drive signal until a falling timing thereof. Subsequently, the electromagnetic wave oscillator 32, upon receiving the pulse current, continuously oscillates the microwave pulse and outputs it to the distributor 33. Due to an operation delay of the magnetron 32, a start and an end of an oscillation period of the microwave are slightly delayed in relation to a start and an end of an output period of the pulse current, respectively.

Figure 5:
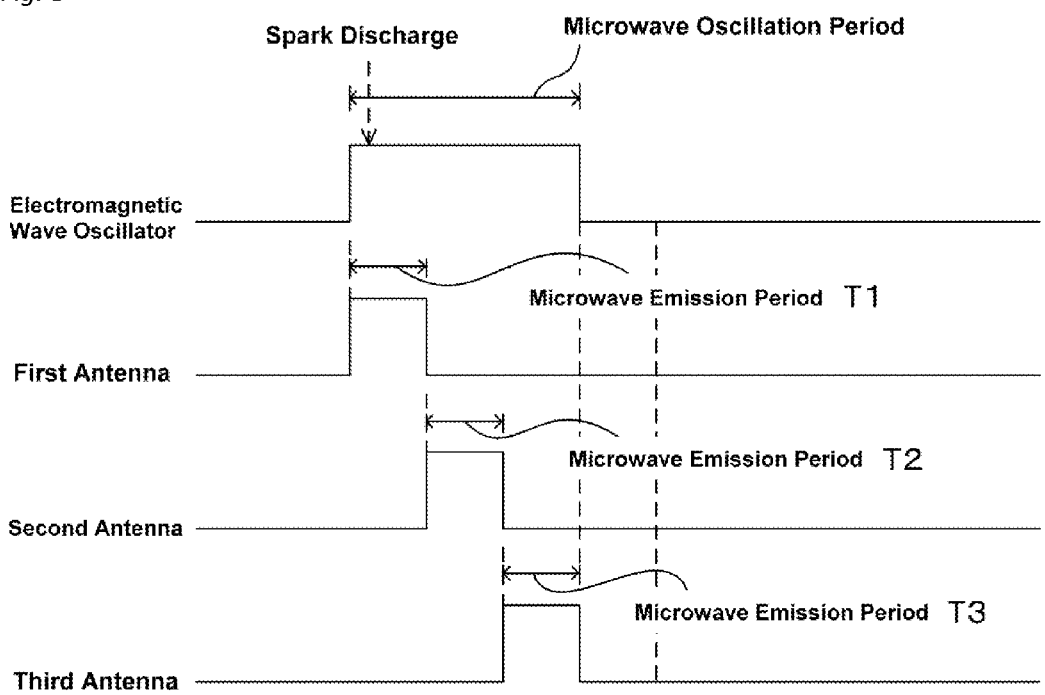
FIG. 5 is a time chart illustrating microwave emission period from each antenna and the like according to the embodiment.

During the ignition operation, the ignition signal and the electromagnetic wave drive signal are outputted so that the spark discharge is caused immediately after the start of the oscillation period of the microwave, as shown in FIG. 5. During the oscillation period of the microwave, firstly, the distributor 33 specifies the first antenna 41 as a supply destination of the microwave pulse. The microwave is emitted from the first antenna 41 to the combustion chamber 20. At a timing when the spark discharge is caused, a strong electric field region 51, which has an electric field relatively strong in intensity in the combustion chamber 20, is formed in the vicinity of the emitting end of the first antenna 41. As shown in FIG. 3*a*, the discharge plasma 36 caused by the spark discharge is drifted due to the strong tumble flow 35 toward the side of the exhaust ports 26, and the flexure part thereof enters into the strong electric field region 51. The flexure part of the discharge plasma 36 is irradiated with the microwave. The discharge plasma 36 absorbs the energy of the microwave and thickens, and consequently forms a relatively large scale of microwave plasma in the strong electric field region 51. In the strong electric field region 51, the fuel air mixture in the combustion chamber 20 is volume ignited due to the microwave plasma. Subsequently, a flame surface expands outwardly from an ignition location toward the wall surface of the cylinder 24.

<Flame Propagation Promotion Operation>

In one combustion cycle, a flame propagation promotion operation of increasing a flame propagation speed is performed during a flame propagation after the ignition operation.

According to the present embodiment, as the flame propagation promotion operation, a first operation and a second operation are performed. In the first and second operations in series, the supply destination of the microwave is switched in order from the first antenna 41, the second antenna 42, and the third antenna 43 in turn. Here, the pulse width of the electromagnetic wave drive signal is configured so that the microwave pulse is continuously outputted until immediately after the flame surface reaches the wall surface of the cylinder 24.

During the first operation, the electronic control device 30 outputs a first distribution signal immediately before the flame surface reaches the emitting end of the second antenna 42. For example, the first distribution signal is outputted at a timing when the flame surface is passing through approximately a midpoint between the first and second antennae 41 and 42. The distributor 33, upon receiving the first distribution signal, switches the supply destination of the microwave to the second antenna 42. Then, as shown in FIG. 3*b*, the microwave is emitted from the second antenna 42 to the combustion chamber 20, and a strong electric field region 52 is formed in the vicinity of the emitting end of the second antenna 42. From the second antenna 42, the microwave is emitted until immediately after the flame surface has passed through the strong electric field region 52.

In the strong electric field region 52, for example, free electrons discharged from the flame are accelerated. The accelerated free electrons collide with ambient gas molecules. The gas molecules thus collided are ionized. Also, free electrons discharged due to the ionization of the gas molecules are accelerated in the strong electric field region 52, and ambient molecules are ionized. In this manner, an avalanche-like gas molecule ionization occurs, and the microwave plasma is generated in the strong electric field region 52.

In the strong electric field region 52, active species (such as OH radical) having strong oxidation power are generated by the microwave plasma. According to the present embodiment, while the flame is propagated following the ignition of the fuel air mixture, the active species are generated in a region not yet reached by the flame surface. This means that the flame surface passes through the region in which the active species have been generated. Therefore, oxidation reaction in the flame surface is promoted by the active species, and the flame propagation speed is increased. Also, since the microwave plasma in the strong electric field region 52 is brought into contact with the flame surface of weakly ionized plasma, the flame surface is supplied with the energy of the microwave, thereby the flame propagation speed is further increased.

Then, in the second operation, the electronic control device 30 outputs a second distribution signal immediately before the flame surface reaches the emitting end of the third antenna 43. For example, the second distribution signal is outputted at a timing when the flame surface is passing through approximately a midpoint between the second and third antennae 42 and 43. The distributor 33, upon receiving the second distribution signal, switches the supply destination of the microwave to the third antenna 43. Then, as shown in FIG. 3*c*, a strong electric field region 53 is formed in the vicinity of the emitting end of the third antenna 43. In the strong electric field region 53, the microwave plasma is generated. During the second operation, similarly to the first operation, the microwave plasma is generated in a region not yet reached by the flame surface, and the flame propagation speed is increased owing to the microwave plasma.

Effect of Embodiment

According to the present embodiment, the emitting position of the first antenna 41, from which the microwave is emitted, is located downstream of the discharge gap in relation to the direction of the gas flow 35 at the discharge gap so that the discharge plasma 36 that has been drifted due to the gas flow 35 is irradiated with the microwave. As a result of this, the discharge plasma 36 that has been drifted due to the gas flow 35 is present at a location which the microwave is emitted to. Therefore, in comparison with a conventional internal combustion engine that is not configured in view of the fact that the discharge plasma 36 is drifted, it is possible to increase the energy of the microwave absorbed by the discharge plasma 36. As a result thereof, it is possible to reduce the intensity of the reflected microwave. Therefore, it is possible to reduce the amount of unburned fuel in a case in which a lean fuel air mixture is burned.

Furthermore, according to the present embodiment, it is configured such that the active species are generated in a region not yet reached by the flame surface so that the flame surface passes through the region in which the active species have been generated. Accordingly, oxidation reaction in the flame surface is promoted by the active species, and it is possible to improve the propagation speed of the flame surface.

First Modified Example of Embodiment

Figure 6:
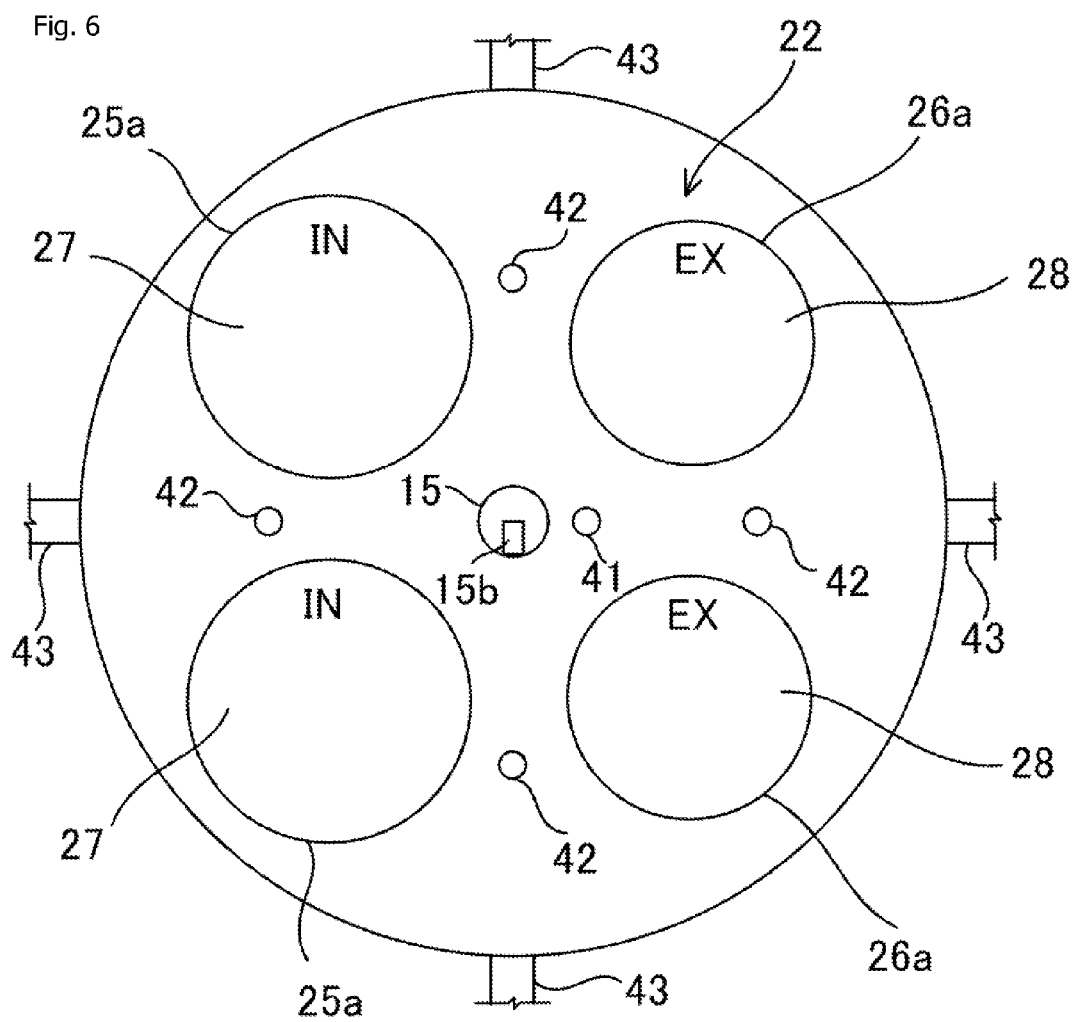
FIG. 6 is a front view of a ceiling surface of a combustion chamber of an internal combustion engine according to a first modified example of the embodiment.

According to the first modified example, as shown in FIG. 6, four antenna groups are provided. The number of antenna groups corresponds to the number of regions defined between adjacent opening parts 25a and 26a of the intake and exhaust ports 25 and 26.

A first antenna group (an antenna group on a right side of the ignition plug 15 in FIG. 6) is constituted by a first antenna 41, a second antenna 42, and a third antenna 43. Each of the remaining second to fourth antenna groups is constituted by a second antenna 42 and a third antenna 43. The electromagnetic wave emission device 13 is provided with an electromagnetic wave unit including a power supply for electromagnetic wave 31, an electromagnetic wave oscillator 32, and a distributor 33 for each antenna group.

The first antenna 41 is supplied with a microwave at the same timing as the first antenna 41 of the embodiment described above. Each second antenna 42 is spaced apart from the ignition plug 15 at the same distance as the second antenna 42 of the embodiment described above, and supplied with a microwave at the same timing as the second antenna 42 of the embodiment described above. Each third antenna 43 is embedded in the gasket 18 similarly to the third antenna 43 of the embodiment described above, and supplied with a microwave at the same timing as the third antenna 43 of the embodiment described above.

According to the first modified example, after ignition of the fuel air mixture by supplying the discharge plasma 36 with the energy of the microwave emitted from the first antenna 41, the flame propagation speed is increased owing to the microwave plasma generated by the microwave emitted from each second antenna 42, and then, another microwave plasma generated by the microwave emitted from each third antenna 43.

Second Modified Example of Embodiment

Figure 7:
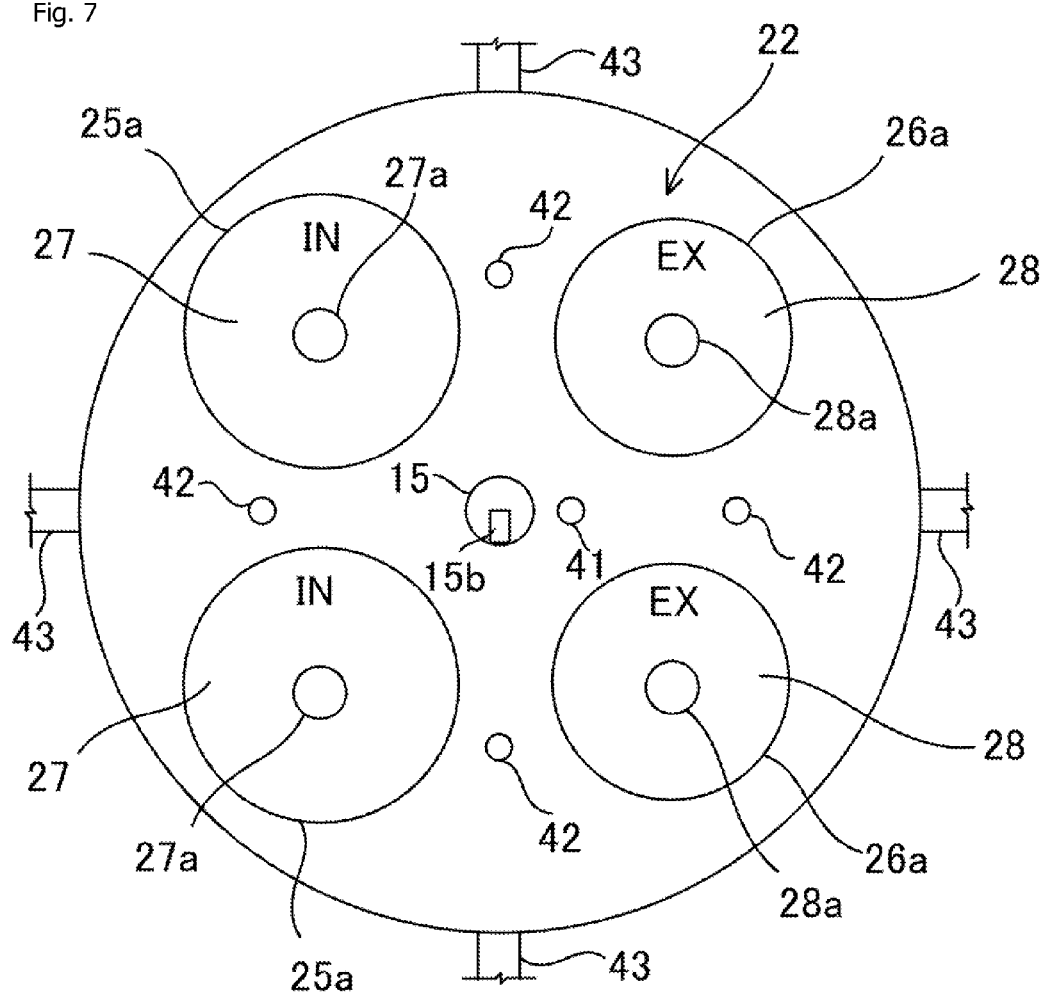
FIG. 7 is a front view of a ceiling surface of a combustion chamber of an internal combustion engine according to a second modified example of the embodiment.

According to the second modified example, as shown in FIG. 7, as antennae for supplying the microwave to regions not yet reached by the flame surface similarly to the second antennae 42 and the third antennae 43, antennae 27a and 28a are provided on respective valve heads of the intake and exhaust valves 27 and 28. Transmission lines connecting to antennae 27a and 28a are provided in respective valve shafts. The microwave outputted from the electromagnetic wave oscillator 32 is supplied to the transmission line byway of non-contact power feeding.

Third Modified Example of Embodiment

According to the third modified example, the emitting position of the antenna for supplying the microwave to the region not yet reached by the flame surface similarly to the second antenna 42 and the third antenna 43, is located at a region where occurrence frequency of knocking is relatively high in the combustion chamber 20. For example, the emitting position of the antenna may be located outwardly from the opening part 25a of the intake port 25.

In the combustion chamber 20, the microwave plasma is generated before the flame surface reaches to the region where occurrence frequency of knocking is relatively high, and the active species are generated along with generation of the microwave plasma. According to the third modified example, since the active species are generated in a region where knocking is likely to be caused, it is possible to prevent the speed of the flame surface from decreasing before the flame surface reaches the concerned region. Accordingly, since it is possible to cause the flame to reach the region where knocking is likely to be caused before knocking occurs, it is possible to suppress occurrence of knocking.

Fourth Modified Example of Embodiment

Figure 8:
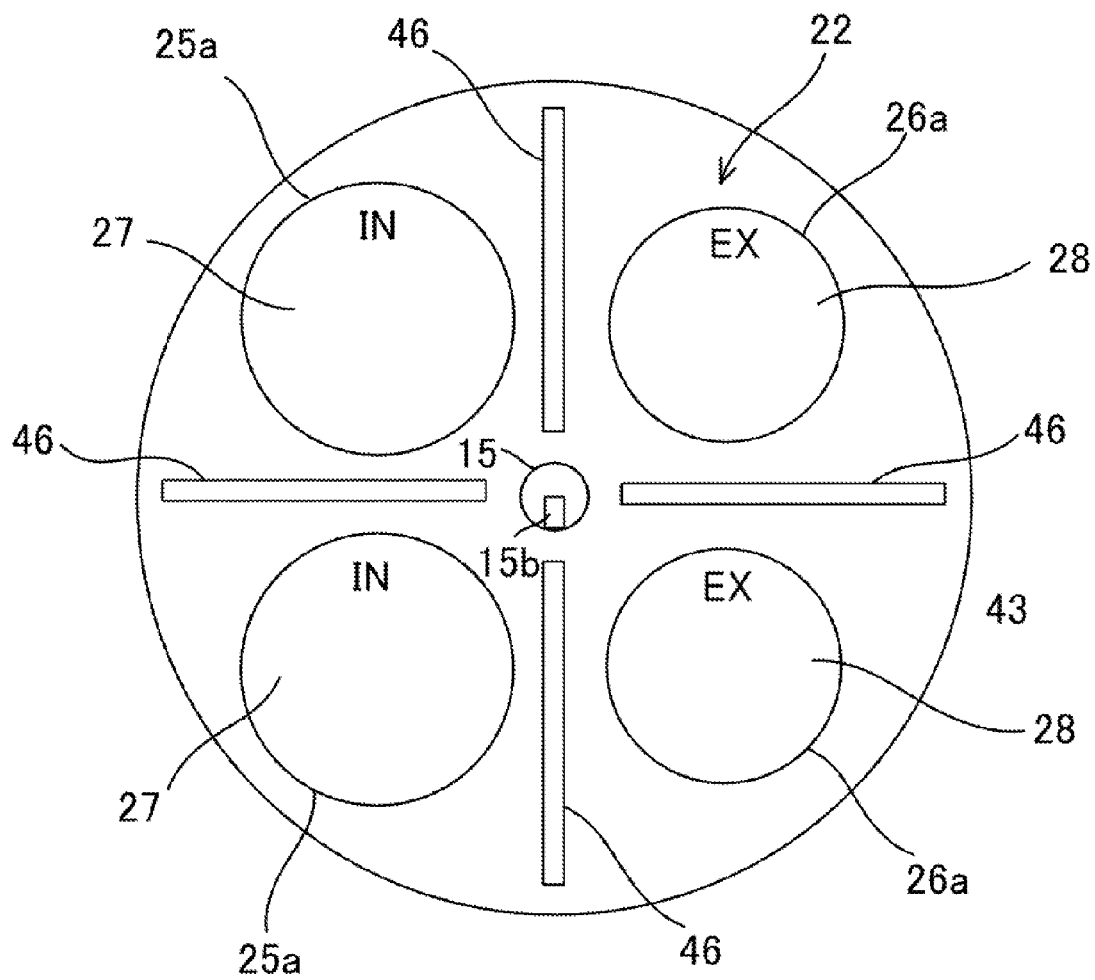
FIG. 8 is a front view of a ceiling surface of a combustion chamber of an internal combustion engine according to a fourth modified example of the embodiment.

According to the fourth modified example, as shown in FIG. 8, in place of the antenna groups of the first modified example, rod shaped antennae 46 are provided. The antennae 46 extend in respective radial directions on the ceiling surface of the combustion chamber 20 along the respective intervening regions each defined by the adjacent opening parts 25a and 26a of the intake and exhaust ports 25 and 26. Each antenna 46 extends slightly outward from the ignition plug 15 straightforwardly toward the vicinity of the wall surface of the cylinder 24. Here, at least the antenna 46 disposed between the adjacent opening parts 26a of the exhaust ports 26 (the antenna on the right side of the ignition plug 15 in FIG. 8) faces toward the flexure part of the discharge plasma 36 at an inner end thereof.

The electromagnetic wave emission device 13 is provided with an electromagnetic wave unit that includes a power supply for electromagnetic wave 31 and an electromagnetic wave oscillator 32 for each antenna 46. Each electromagnetic wave unit, unlike the first modified example, does not include a distributor 33. Instead, each electromagnetic wave unit includes an electric field adjuster that changes a location of a strong electric field region, which has an electric field relatively strong in intensity, on a surface of the antenna 46. The electric field adjuster is, for example, a stub tuner that can adjust impedance of a transmission line of the microwave. The stub tuner is configured to be capable of changing an electrical length of a stub by, for example, adjusting a location of short-circuiting the stub to the ground.

At a time of the ignition operation, each electromagnetic wave unit causes the electric field adjuster to operate so that the strong electric field region is located on the inner end surface of the antenna 46. An emitting position of the antenna 46 disposed between the opening parts 26a of the exhaust ports 26 faces toward the discharge plasma 36 that has been drifted by the tumble flow 35. Accordingly, the discharge plasma 36 effectively absorbs the energy of the microwave. As a result of this, the discharge plasma 36 is thickened, and the fuel air mixture is volume ignited.

The microwave is continuously emitted from each antenna 46 during the flame propagation after the fuel air mixture is ignited. The electric field adjuster moves the emitting position of the microwave on each antenna 46 outwardly ahead of the flame surface. The region not yet reached by the flame surface becomes the strong electric field region. The strong electric field region moves outward, and the microwave plasma generated by the strong electric field region also moves outward along with the movement of the strong electric field region. As a result of this, the flame surface passes through the region in which the active species are generated, oxidation reaction on the flame surface is promoted, and thus, the flame propagation speed is improved.

Fifth Modified Example of Embodiment

Figure 9:
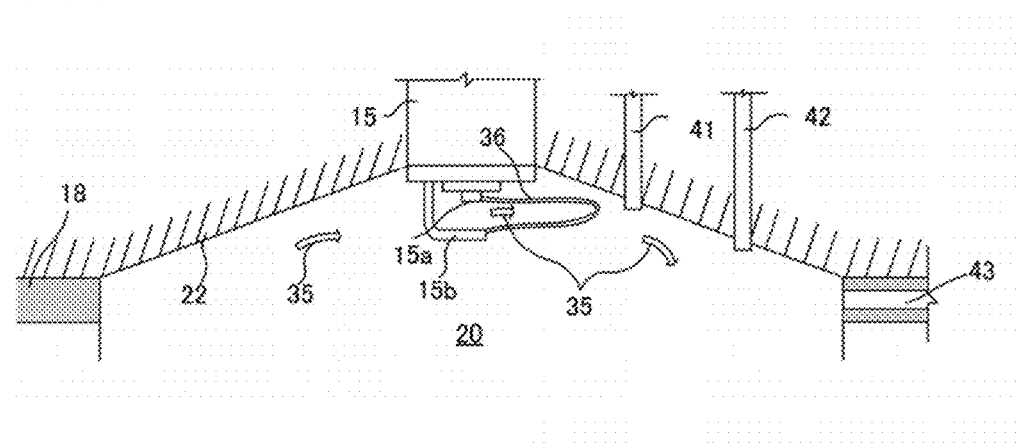
FIG. 9 is a schematic configuration diagram of a relevant part of the internal combustion engine according to a fifth modified example of the embodiment, FIG. 9a showing a case of a first antenna not emitting a microwave, and FIG. 9b showing a case of the first antenna emitting a microwave.
Figure 9:
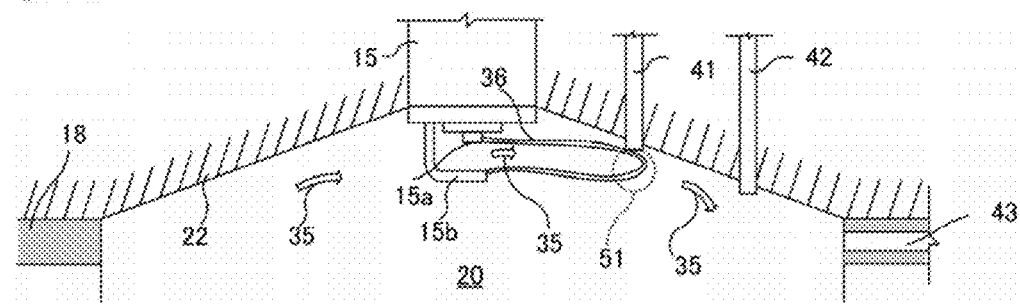

According to the fifth modified example, as shown in FIG. 9, the distance between the first antenna 41 and the ignition plug 15 is increased in comparison with the embodiment described above. During the emission operation at the time of ignition of the fuel air mixture, the emitting position of the microwave on the first antenna 41 is locates downstream of the discharge gap in the direction of the gas flow 35 at the discharge gap. At the time of discharge operation, the microwave emitted from the first antenna 41 creates a strong electric field region 51 in a region adjacent to the discharge plasma 36 that has been drifted by the gas flow 35. The second antenna 42 is disposed in a middle position between the first antenna 41 and an outer periphery of the ceiling surface of the combustion chamber 20.

More particularly, in the ignition operation, the first antenna 41 emits the microwave to the combustion chamber 20 during the same period as the embodiment described above. At the timing of spark discharge, the strong electric field region 51 is created in the vicinity of the emitting end of the first antenna 41.

In a case in which the strong electric field region 51 is not created, the discharge plasma 36 is extended only to a location shown in FIG. 9a. On the other hand, in a case in which the strong electric field region 51 is created, the discharge plasma 36 reacts with an electric field in the strong electric field region 51, and then, stretches and enters into the strong electric field region 51, as shown in FIG. 9b. The discharge plasma 36 effectively absorbs the energy of the microwave, and forms microwave plasma. According to the fifth modified example, since the microwave is absorbed by the discharge plasma 36, it is possible to reduce the intensity of the reflected microwave.

Sixth Modified Example of Embodiment

Figure 10:
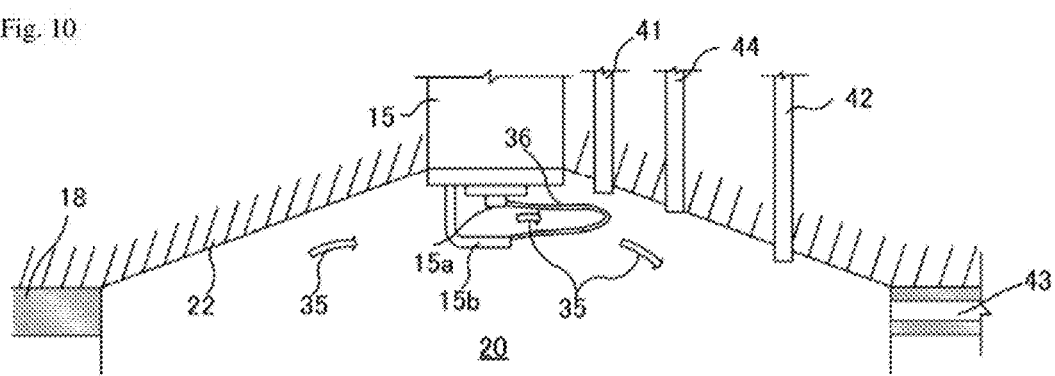
FIG. 10 is a schematic configuration diagram of a relevant part of the internal combustion engine according to a sixth modified example of the embodiment

According to the sixth modified example, as shown in FIG. 10, in addition to the three antennae 41 to 43 of the embodiment described above, a fourth antenna 44 is provided at the location of the first antenna of the fifth modified example. During the emission operation, an emitting position of the microwave on the fourth antenna 44 is located downstream of the discharge gap, further away from the emitting position of the first antenna 41 in the direction of the gas flow 35 at the discharge gap. At the time of the discharge operation, the microwave emitted from the fourth antenna 44 creates a strong electric field region in a region adjacent to the discharge plasma 36 that has been drifted by the gas flow 35.

More particularly, firstly, the first antenna 41 starts to emit the microwave in the ignition operation. A spark discharge is caused immediately after the microwave emission starts. The microwave emission from the first antenna 41 is maintained until immediately after the spark discharge. The discharge plasma 36 that has been stretched due to the tumble flow 35 absorbs the energy of the microwave emitted from the first antenna 41, and then thickens.

Subsequently, immediately after the spark discharge, the distributor 33 switches the supply destination of the microwave to the fourth antenna 44. In the vicinity of an emitting end of the fourth antenna 44, the strong electric field region is created. The thickened discharge plasma 36 reacts with an electric field of the strong electric field region in the vicinity of the emitting end of the fourth antenna 44. The discharge plasma 36 is supplied with the energy of the microwave also from the fourth antenna 44. As a result thereof, the fuel air mixture is volume ignited by the discharge plasma 36. According to the sixth modified example, it is possible to supply a larger amount of energy to the discharge plasma 36.

An emission period of the microwave from the first antenna 41 may overlap with an emission period of the microwave from the fourth antenna 44. In this case, for example, a first electromagnetic wave oscillator that supplies a microwave to the first antenna 41, and a second electromagnetic wave oscillator that supplies a microwave to the fourth antenna 44 may be provided. Oscillation periods of the microwaves by the electromagnetic wave oscillators may be the same, or a start and end of the oscillation period of the second electromagnetic wave oscillator may be delayed than those of the other.

Seventh Modified Example of Embodiment

Figure 11:
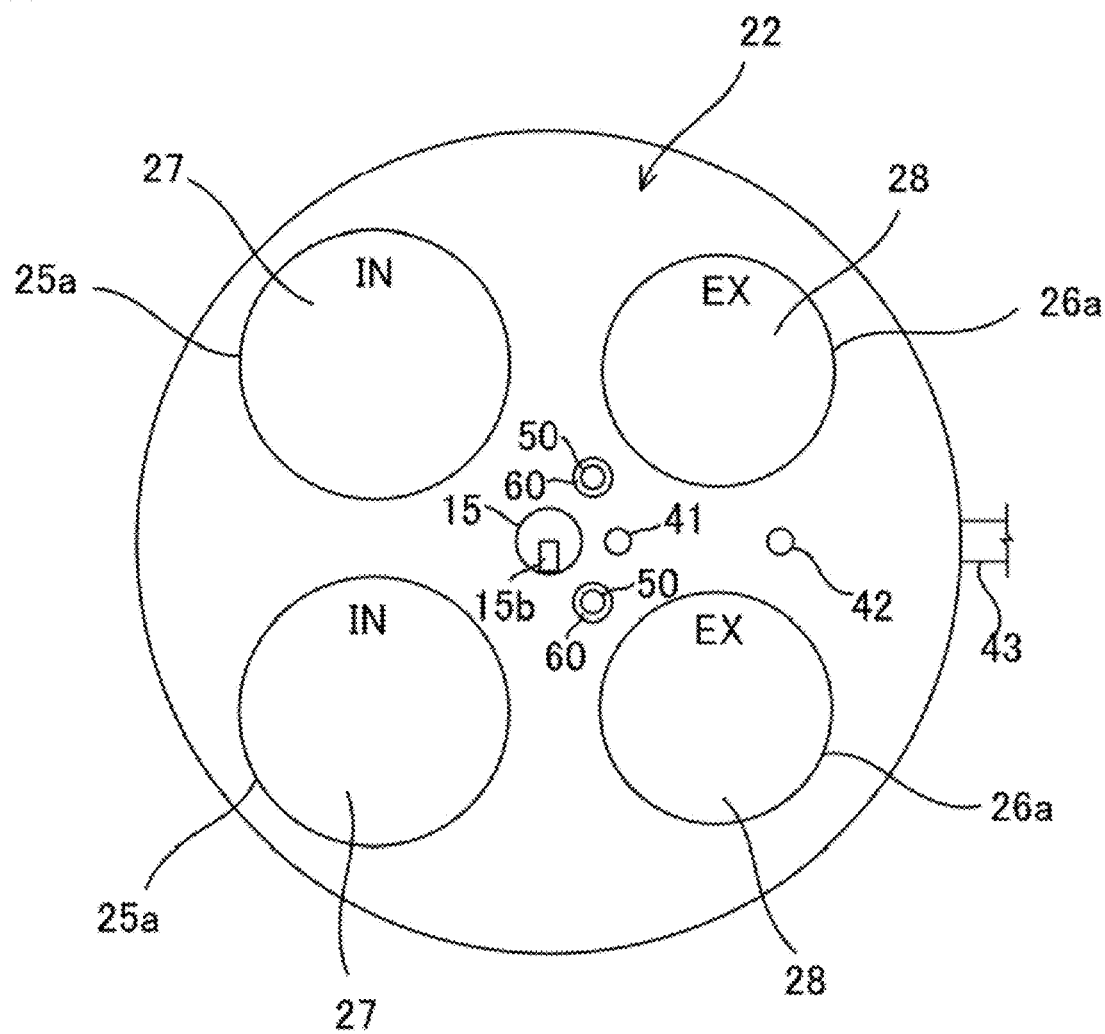
FIG. 11 is a front view of a ceiling surface of a combustion chamber of an internal combustion engine according to a seventh modified example of the embodiment.

According to the seventh modified example, as shown in FIG. 11, floating electrodes 50, operative to keep the discharge plasma 36 drifting at a constant direction, are provided on an exposed surface of the cylinder head 22. The exposed surface of the cylinder head 22 is exposed toward the combustion chamber 20. A pair of the floating electrodes 50 are provided facing toward each other on opposite sides with respect to the direction of the gas flow 35 at the discharge gap (a line connecting the ignition plug 15 and the first antenna 41). Each floating electrode 50 is insulated from the cylinder head 22 by an insulating member 60.

Eighth Modified Example of Embodiment

Figure 12:
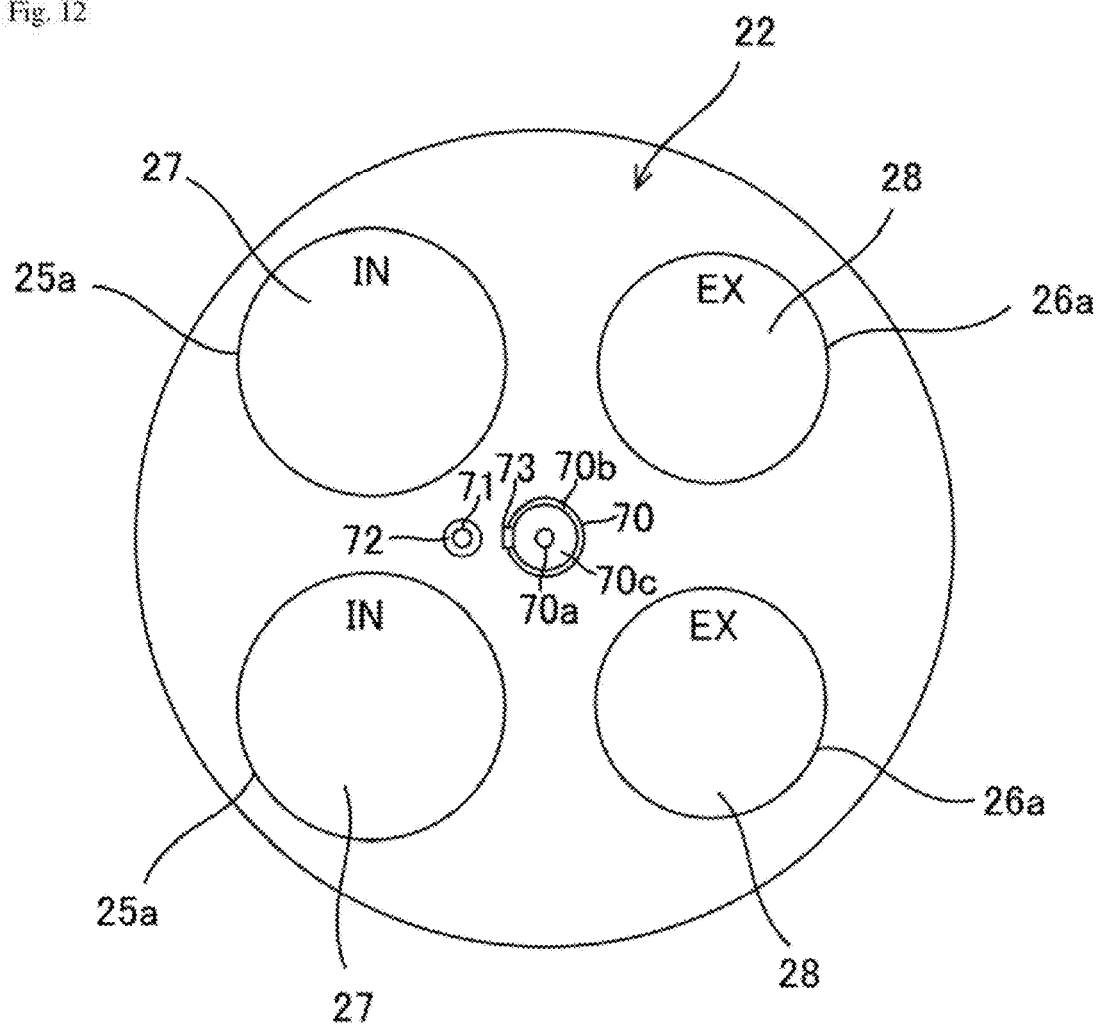
FIG. 12 is a front view of a ceiling surface of a combustion chamber of an internal combustion engine according to an eighth modified example of the embodiment.

According to the eighth modified example, as shown in FIG. 12, on the ceiling surface of the combustion chamber 20, a plug for microwave 70 is provided at a center of the combustion chamber 20 and a discharge electrode 71 is provided on a left side of the plug for microwave 70 in FIG. 12.

The plug for microwave 70 constitutes a coaxial line, and is provided with a central conductor 70a, an outer conductor 70b, and an insulator 70c. The plug for microwave 70 is supplied with a microwave pulse oscillated by the electromagnetic wave oscillator 32. A ground electrode 73 that forms a discharge gap along with the discharge electrode 71, which will be described later, is connected to the outer conductor 70b of the plug for microwave 70. The ground electrode 73 is formed in a shape of a plate and protruded from an edge surface of the outer conductor 70b. As the plug for microwave 70, a type of an ignition plug having a ground electrode sharply bent (type of an ignition plug having a ground electrode protruded from the outer conductor in an axial direction of the ignition plug and sharply bent in a manner as facing toward a central electrode), from which a tip end part of the ground electrode is omitted, may be employed.

The discharge electrode 71 is formed in a shape of a plate or a rod. The discharge electrode 71 is insulated from the cylinder head 22 by an insulator 72. The discharge electrode 71 and the ground electrode 73 are protruded from the ceiling surface of the combustion chamber 20. In comparison between the discharge electrode 71 and the ground electrode 73, protrusion length of the discharge electrode 71 is longer than that of the ground electrode 73. The discharge electrode 71 is supplied with a high voltage pulse outputted from the ignition coil 14. Then, discharge plasma 36 is generated at the discharge gap. Here, the discharge electrode 71 may be bent sharply toward a side of the ground electrode 73 so that a tip end of the discharge electrode 71 is located closest to the ground electrode 73.

According to the eighth modified example, the discharge gap is formed upstream of the plug for microwave 70 in the direction of the gas flow 35 in the vicinity of a tip end of the plug for microwave 70. The discharge plasma 36 generated at the discharge gap is drifted toward the plug for microwave 70 due to the gas flow 35. A tip end surface of the plug for microwave 70 faces toward the discharge plasma 36 that has been drifted due to the gas flow 35. The discharge plasma 36 that has been drifted due to the gas flow 35 is present at a location which the microwave is emitted to. Accordingly, it is possible to cause the discharge plasma 36 to effectively absorb the energy of the microwave.

Furthermore, according to the eighth modified example, since an ignition location (an ignition region) of the fuel air mixture is close to a central part of the combustion chamber 20, it is possible to improve uniformity in diffused state of the flame, thereby making it possible to reduce an amount of unburned fuel air mixture. Furthermore, since the plug for microwave 70 is disposed at a central part of the ceiling surface of the combustion chamber 20, it is possible to increase the cross section area of the plug for microwave 70, thereby making it possible to reduce reflection of the microwave at the tip end part of the plug for microwave 70.

Other Embodiments

The embodiment described above may also be configured as follows.

According to the embodiment described above, the microwave may be emitted to a region which the flame surface has been passed through so as to generate microwave plasma, thereby promoting the propagation of the flame surface from behind the flame surface. For example, even after the flame surface has passed through between the second antenna 42 and the third antenna 43, the microwave emission from the second antenna 42 may be continued so as to maintain the microwave plasma in the vicinity of the emitting end of the second antenna 42. In this case, temperature rises owing to the microwave in the region which the flame has passed through, and accordingly, oxidation reaction of the fuel air mixture is promoted. Furthermore, since pressure rises behind the flame surface, flame propagation is promoted.

Furthermore, in the embodiment described above, the emitting position of the microwave on each of antennae 41 to 43 may be covered by an insulator or dielectric material.

INDUSTRIAL APPLICABILITY

The present invention is useful in relation to an internal combustion engine provided with an electromagnetic wave emission device that emits an electromagnetic wave to a combustion chamber.

EXPLANATION OF REFERENCE NUMERALS

10 Internal Combustion Engine
11 Internal Combustion Engine Main Body
12 Discharge Device
13 Electromagnetic Wave Emission Device
20 Combustion Chamber
32 Electromagnetic Wave Oscillator
41 First Antenna
42 Second Antenna
43 Third Antenna

What is claimed is:
1. An internal combustion engine comprising:
an internal combustion engine main body provided with an intake valve and an exhaust valve and configured to produce a predetermined gas flow from a side of the intake valve to a side of the exhaust valve in a combustion chamber;
a discharge device that generates discharge plasma at a discharge gap located between the side of the intake valve and the side of the exhaust valve in the combustion chamber, the discharge plasma drifting along a direction of the gas flow; and
an electromagnetic wave emission device including an electromagnetic wave oscillator that oscillates an electromagnetic wave, and an antenna for emitting the electromagnetic wave supplied from the electromagnetic wave oscillator to the combustion chamber, wherein
the internal combustion engine simultaneously performs a discharge operation of causing the discharge device to generate the discharge plasma and an emission operation of emitting the electromagnetic wave from the antenna by driving the electromagnetic wave oscillator, thereby supplying the discharge plasma with energy of the electromagnetic wave so as to ignite fuel air mixture in the combustion chamber,
the electromagnetic wave emission device is configured such that an emitting position of the electromagnetic wave on the antenna during the emission operation is located downstream of the discharge gap in the direction of the gas flow at the discharge gap so as to face toward the discharge plasma that has been drifted due to the gas flow,
the electromagnetic wave emission device is configured to emit the electromagnetic wave from the antenna to a region which the flame surface has passed through after the fuel air mixture has been ignited, and
a pair of floating electrodes are provided to a surface of a cylinder head in a position between the intake and exhaust valves of the internal combustion engine and facing toward each other on opposite sides with respect to an imaginary line passing through the discharge gap and the emitting position of the electromagnetic wave on the antenna during the emission operation, the pair of floating electrodes being located on the side of the exhaust valve with respect to the discharge gap of the discharge device and surrounded by an insulating member so as to electrically be floated such that the pair of floating electrodes are electrically insulated from other elements of the internal combustion engine which include the discharge device and the electromagnetic wave emission device.

2. The internal combustion engine according to claim 1, wherein
an antenna having an emitting position of the electromagnetic wave during the emission operation, the emitting position facing toward the discharge plasma that has been drifted due to the gas flow, is assumed as a first antenna,
the electromagnetic wave emission device includes, in addition to the first antenna, a second antenna for emitting an electromagnetic wave, and an emitting position on the second antenna during the emission operation is located downstream of the discharge gap further away from the emitting position of the electromagnetic wave on the first antenna in relation to the direction of the gas flow at the discharge gap so that the electromagnetic wave emitted at a time of the discharge operation from the second antenna creates a strong electric field region, which has an electric field relatively strong in intensity in the combustion chamber, in a region adjacent to the discharge plasma that has been drifted due to the gas flow.

3. The internal combustion engine according to claim 2, wherein
the electromagnetic wave emission device includes a third antenna located further away from the discharge device than the first antenna and the second antenna, and generates electromagnetic wave plasma by emitting the electromagnetic wave from the third antenna to a region not yet reached by a flame surface after the fuel air mixture has been ignited.

4. The internal combustion engine according to claim 3, wherein
the third antenna is located so as to emit the electromagnetic wave to a region where occurrence frequency of knocking is relatively high in the combustion chamber.

5. An internal combustion engine comprising:
an internal combustion engine main body provided with an intake valve and an exhaust valve and configured to produce a predetermined gas flow from a side of the intake valve to a side of the exhaust valve in a combustion chamber;
a discharge device that generates discharge plasma at a discharge gap located in the combustion chamber, the discharge plasma drifting along a direction of the gas flow; and
an electromagnetic wave emission device including an electromagnetic wave oscillator that oscillates an electromagnetic wave, and an antenna for emitting the electromagnetic wave supplied from the electromagnetic wave oscillator to the combustion chamber, wherein
the internal combustion engine simultaneously performs a discharge operation of causing the discharge device to generate the discharge plasma and an emission operation of emitting the electromagnetic wave from the antenna by driving the electromagnetic wave oscillator, thereby supplying the discharge plasma with energy of the electromagnetic wave so as to ignite a fuel air mixture in the combustion chamber,
the electromagnetic wave emission device is configured such that an emitting position of the electromagnetic wave on the antenna during the emission operation is located downstream of the discharge gap in the direction of the gas flow at the discharge gap so that the electromagnetic wave emitted from the antenna at a time of the discharge operation creates a strong electric field region, which has an electric field relatively strong in intensity in the combustion chamber, in a region adjacent to the discharge plasma that has been drifted due to the gas flow,
the electromagnetic wave emission device is further configured to emit the electromagnetic wave from the antenna to a region which the flame surface has passed through after the fuel air mixture has been ignited, and
a pair of floating electrodes are provided to a surface of a cylinder head in a position between the intake and exhaust valves of the internal combustion engine and facing toward each other on opposite sides with respect to an imaginary line passing through the discharge gap and the emitting position of the electromagnetic wave on the antenna during the emission operation, the pair of floating electrodes being located on the side of the exhaust valve with respect to the discharge gap of the discharge device and surrounded by an insulating member so as to electrically be floated such that the pair of floating electrodes are electrically insulated from other elements of the internal combustion engine which include the discharge device and the electromagnetic wave emission device.

* * * * *